United States Patent [19]

Foster et al.

[11] Patent Number: 4,726,104
[45] Date of Patent: Feb. 23, 1988

[54] METHODS FOR WELD REPAIRING HOLLOW, AIR COOLED TURBINE BLADES AND VANES

[75] Inventors: Michael F. Foster, Hartford; Thomas A. Ferguson, Manchester, both of Conn.

[73] Assignee: United Technologies Corporation, Hartford, Conn.

[21] Appl. No.: 932,961

[22] Filed: Nov. 20, 1986

[51] Int. Cl.⁴ .................. B23P 15/02; C04B 35/02
[52] U.S. Cl. .................. 29/156.8 B; 29/156.8 H; 29/402.18; 29/DIG. 48; 228/118; 228/119; 416/97 R; 501/95
[58] Field of Search .............. 29/156.8 B, 156.8 H, 29/156.8 R, 402.18, DIG. 48; 228/118, 119, 215; 416/97 R; 501/95

[56] References Cited

U.S. PATENT DOCUMENTS

| | | | |
|---|---|---|---|
| 2,641,439 | 6/1953 | Williams | 29/156.8 B |
| 2,679,669 | 6/1954 | Kempe | 29/156.8 B |
| 2,972,806 | 2/1961 | Hignett et al. | 29/156.8 H |
| 3,014,269 | 12/1961 | Graham et al. | 29/156.8 H |
| 3,014,270 | 12/1961 | Eccles | 29/156.8 H |
| 3,196,043 | 7/1965 | Harris et al. | 427/124 |
| 3,576,065 | 4/1971 | Frazier | 29/402.18 |
| 3,629,116 | 12/1971 | Gartner et al. | 501/95 X |
| 3,994,740 | 11/1976 | Morton | 501/95 |
| 4,028,787 | 6/1977 | Cretella et al. | 29/156.8 B |
| 4,050,133 | 9/1977 | Cretella et al. | 29/402.18 X |
| 4,128,929 | 12/1978 | DeMusis | 29/156.8 B |
| 4,141,127 | 2/1979 | Cretella et al. | 29/402.18 X |
| 4,176,433 | 12/1979 | Lee et al. | 29/156.8 B |
| 4,379,111 | 4/1983 | Smith | 501/95 X |
| 4,611,744 | 9/1986 | Fraser et al. | 228/119 |

Primary Examiner—P. W. Echols
Assistant Examiner—Ronald S. Wallace
Attorney, Agent, or Firm—James M. Rashid

[57] ABSTRACT

A mask particularly useful in the weld repair of air cooled gas turbine blades and vanes contains a mixture of ceramic particles in a liquid carrier. The mask is applied onto the surface of the blade or vane, and into the cooling holes. Following a sintering treatment, an inert, thermally stable, electrically nonconductive ceramic mask is produced, which is easily removed after welding.

9 Claims, 8 Drawing Figures

METHODS FOR WELD REPAIRING HOLLOW, AIR COOLED TURBINE BLADES AND VANES

TECHNICAL FIELD

This invention relates to methods for welding metal components. In particular, it relates to methods for weld repairing superalloy components used in gas turbine engines.

BACKGROUND

Hollow, air cooled blades and vanes are commonly used in modern gas turbine engines. These components have an internal cavity through which air flows during engine operation. This air is discharged through holes, called cooling holes, which are present in the airfoil section and sometimes present in the platform and tip. See, e.g., commonly assigned U.S. Pat. No. 4,474,532 to Pazder. The passage of air through and over the blade or vane extracts heat from the component surface, allowing use of the component even when the gas stream temperature exceeds the melting temperature of the alloy from which it is made.

Some gas turbine engines are designed so that during engine operation, the tip portion of the rotating blades rubs a stationary seal, and limits the leakage of working medium gases in the axial flow direction. While the seals are usually more abradable than are the blade tips (so that during such rub interactions, a groove is cut into the seal), the blade tips do wear, and the blades become shorter. As the blades accummulate service time, the total tip wear increases to the point that eventually, the efficiency of the blade and seal system is reduced, and the seal and blades need to be repaired or replaced.

The tips of worn blades can be repaired, and the length of the blade increased, by the addition of weld filler metal to the tip using any of the welding techniques (typically arc welding techniques) known to those skilled in the art. During such a weld repair operation, cooling holes near the blade tip are susceptible to being welded shut. These cooling holes must then be redrilled, e.g., using conventional laser or electrodischarge machining (EDM) techniques, before the blade can be used again.

However, with some blades used in advanced gas turbine engines, it is not practical to redrill the cooling holes after weld repairing the tip. This is due to the complex geometry of the holes, sometimes referred to as diffusion or shaped holes. See, e.g., U.S. Pat. Nos. 3,527,543 to Howald and 4,197,443 to Sidenstick. Air discharged through these holes forms an insulative film over the surface of the blade during engine operation, which further protects the blade from the effects of operating at very high temperatures. Shaped holes have a nonuniform cross section; for example, the entrance or metering portion of the hole generally has a very small diameter (in the range of about 0.010–0.050 cm (0.005–0.020 in.)) while the exit or diffuser portion of the hole has a relatively large diameter (in the range of about 0.090–0.115 cm (0.035–0.045 in.)). Furthermore, shaped holes may have a square cross section at the metering portion and rectangular cross section at the diffuser portion.

As can therefore be appreciated, the formation of shaped holes can be a difficult and technically complex operation. Consequently, if a blade having shaped holes is weld repaired, such a repair operation is preferably done so that the holes are not welded shut and do not have to be redrilled. Accordingly, what is needed is a method for weld repairing components having shaped cooling holes so that the holes are shielded from the molten filler metal and do not need to be redrilled after the weld operation.

U.S. Pat. No. 3,576,065 to Frazier discloses one method for weld repairing hollow gas turbine engine vanes having cooling holes with a constant diameter of about 0.125 cm (0.050 in.). Prior to welding, cylindrical ceramic inserts are inserted into and plug each of the holes; it is stated that the inserts prevent weld filler metal from entering the holes. Cylindrical inserts would not fill and therefore not protect shaped holes from molten filler metal, due to the noncylindrical and nonuniform cross section of the holes. Furthermore, the small diameter of shaped holes would require equally small diameter ceramic inserts. Such inserts, even if fabricable, would be extremely brittle, difficult to handle, and therefore have questionable utility.

SUMMARY OF THE INVENTION

This invention relates to a method for preventing the deposition and solidification of weld filler metal on particular areas of a component being welded. In other words, the invention relates to a shield or mask useful in a welding operation. The invention has particular utility in preventing arc weld deposited filler metal from solidifying in small diameter cooling holes of hollow, air cooled blades and vanes used in gas turbine engines when the component is welded in an area near the cooling holes. The invention is also useful in preventing filler metal from solidifying on the airfoil surface of blades and vanes. According to the invention, the area to be masked is covered (i.e., plugged or coated) with a mixture or compound of ceramic particles in a liquid carrier. Then, the component is heated to evaporate the liquid carrier and to sinter the ceramic particles to each other to form a structurally sound ceramic mask. The constituents in the compound are chosen to minimize the amount of the volume change (contraction or expansion) which occurs during sintering or welding, and so that the fired mask is resistant to thermal shock, nonreactive with the molten filler metal and alloy from which the component being welded is made, and easily removable after the welding process. Preferably, the mask is also electrically nonconductive.

A preferred mixture of ceramic particles to form the mask is silica, zircon and alumina fiber; colloidal silica is added to this mixture in a quantity sufficient to form a compound having a paste-like consistency. Such a consistency is easy to apply onto airfoil surfaces and into the cooling holes, and it conforms to the nonuniform shape of diffusion holes. This compound also retains its shape once fired, withstands the temperature extremes of a welding operation and is easily removed from the holes after the welding operation.

BEST MODE FOR CARRYING OUT THE INVENTION

This invention will be described primarily with respect to the weld repair of a hollow, air cooled blade used in the turbine section of a gas turbine engine. However, it will be equally applicable to the weld repair of other components such as stationary turbine vanes, or in the repair of other metal components.

Figure 1:
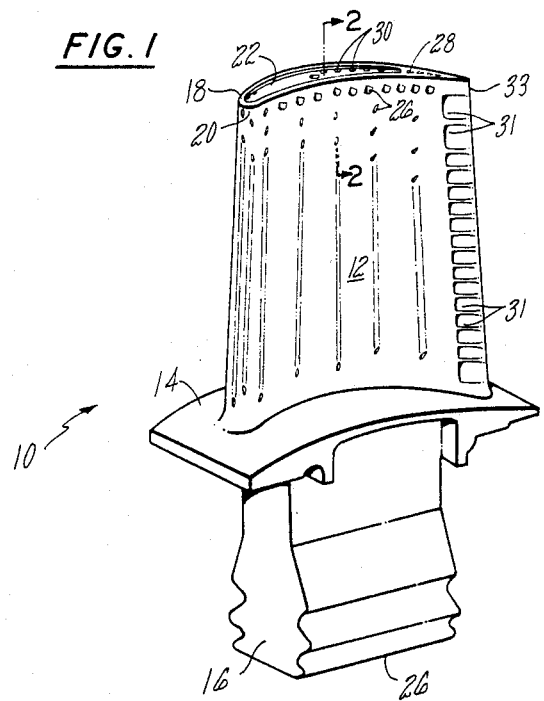
FIG. 1 is a perspective view of a turbine blade for a gas turbine engine.
Figure 2:
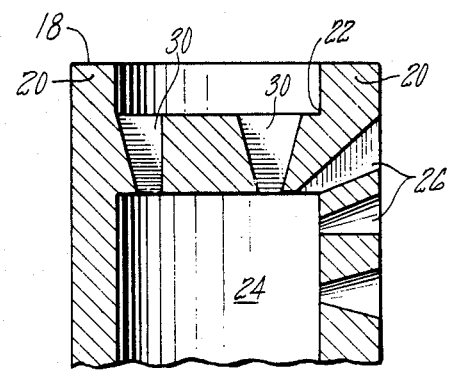
FIG. 2 is a simplified sectional view taken along the lines 2—2 of FIG. 1.

Referring to FIG. 1, a turbine blade is represented by the general reference numeral 10. The blade is fabricated from a nickel base superalloy such as the alloy described in U.S. Pat. No. 4,209,348 to Duhl et al. The blade 10 has an airfoil portion 12, a platform 14, and a root 16. Recessed below the surface 18 of the blade tip 20 is a squealer pocket 22. As is also seen in FIG. 2, the blade 10 is hollow, having a cavity 24 which extends from the base 26 of the blade root 16 to near the blade tip 20. Cooling holes extend from the cavity 24 to the external surface of the blade 10. During engine operation, air is flowed into the cavity 24 and exits the blade 10 through the cooling holes. Several of the holes 26 extend from the cavity 24 to the airfoil surface 12; several other holes 28 extend from the cavity 24 to the surface 18 of the blade tip 20; and several other holes 30 extend from the cavity 24 to the squealer pocket 22. In the blade 10 shown in the Figures, the holes 26 and 30 have a diffusion or shaped hole configuration; while the holes 28 have a conventional (i.e., constant geometry) configuration. The blade 10 in FIG. 1 also has cooling holes 31 which extend from the cavity 24 to the trailing edge 33. It should be understood that the invention is not limited to the weld repair of a component having the same distribution of holes as does the blade 10 shown in the Figures. As stated above, it may be used on a broader category of components.

As noted in the Background section, as a result of the complex geometry of shaped cooling holes, their formation is a technically complex, time consuming, and expensive part of the overall blade fabrication. Consequently, when turbine blades having shaped holes are in need of weld repair, it is preferred that the holes not be welded shut, and that their size and shape not be altered.

According to this invention, molten weld filler metal is prevented from solidifying within cooling holes and upon any other surfaces of the blade which are preferably kept free of the filler by a mask of sintered ceramic particles present in the holes and on these other surfaces. The ceramics in the mask are nonreactive (inert) with the blade substrate, and are thermally stable, i.e., resistant to degradation at the welding temperatures and resistant to thermal shock which takes place on solidification of the molten filler metal. Further, the ceramics are dimensionally stable, i.e., they do not expand or contract an excessive amount during the sintering treatment or during the welding operation. As will be discussed below, when arc welding techniques are used, the mask is preferably electrically nonconductive, and prevents an arc from being maintained between a welding electrode and the component being weld repaired. Finally, the mask is easily removed from the repaired component after welding.

Since the composition of the superalloys used to make modern gas turbine engine components are closely controlled, it is readily understood why the ceramics in the mask must not react with the superalloy. For similar reasons, the ceramics must also not react with the molten filler metal. Resistance to high temperature degradation and thermal shock is necessary because the mask must have sufficient structural integrity to act as a physical barrier to keep the molten weld bead from solidifying on the surfaces being shielded. The mask must be dimensionally stable; in other words, there should not be a drastic volumetric change in the mask during the sintering operation or during the welding operation. If there was such a change, the molten weld bead might be able to solidify upon the areas which are intended to be weld bead free. The combined volume change during sintering and welding should not be more than about one or two percent.

Since arc welding techniques such as tungsten inert gas (TIG) are preferably used in weld repairing components according to this invention, the sintered mask should be sufficiently nonconductive to prevent an arc from passing between the substrate and the welding electrode. The ability of the mask to prevent an arc from being maintained prevents the filler metal from being melted, and therefor, from being deposited on the surface which is masked. The need for nonconductivity is most important when the mask is used to shield major blade surfaces like airfoil, tip, platform, etc. surfaces. The need for electrical nonconductivity appears to be less important when the mask is used only to shield cooling holes.

Finally, the mask must be readily removed from the blade after the welding process. This not only includes easy removal of the mask, but also complete removal of the mask. As can be appreciated by those skilled in the art, the blade could be seriously damaged during service use if all of the mask were not removed after the weld operation.

The above mask properties may be achieved by using one or more of the single or complex oxides of Group IIA, IIIA, IVA, IIIB or IVB elements. Also, single or complex oxides of the rare earth elements may be used. Preferred simple oxides include silica, alumina, yttria, and hafnia. Preferred complex oxides include zirconium orthosilicate and aluminum silicate, and other similar spinel groups. Most preferably, the ceramic mixture contains, on a weight percent basis, about 10-50 percent zirconium orthosilicate (zircon), 1-20 percent alumina, balance silica. Silica is a desired constituent because it is, in general, nonreactive with the blade and filler metal alloys, has good thermal characteristics (high resistance to thermal shock and a low thermal expansion coefficient) and is readily dissolved in caustic leaching solutions. Zircon is desired since it, too, has a high shock resistance, and also has high thermal conductivity. Alumina, preferably alumina fibers, are a constituent in the ceramic mixture to add strength to the sintered mask.

The preferred liquid carrier to use with the silica-zircon-alumina mixture is aqueous colloidal silica. When colloidal silica is mixed with silica, zircon and alumina, the silica in suspension infiltrates the interstices between the larger silica and zircon particles and the alumina fibers, and enhances the leachability of the mixture after it has been fired.

The following examples are provided to illustrate the invention.

EXAMPLE I

A mixture of ceramic constituents containing, on a weight basis, about 64% fused silica powder, about 3% fumed silica powder, about 28% zircon powder, and about 3% high aspect ratio alumina fiber was blended with colloidal silica to form a paste-like compound mixture. The ratio of the ceramics to colloidal silica was about 50-50 by weight (i.e., between about 30-70 and 70-30); however, the actual ratio of constituents (i.e., ceramic to colloidal silica) is not as important as is the resultant consistency of the compound, which was in the range of about 20,000–50,000 centipoise. Compounds having this range of viscosity readily adhere to metallic surfaces, and have good flowability.

Figure 3:
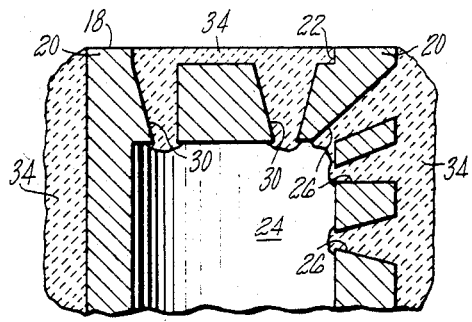
FIG. 3 is similar to FIG. 2 and shows the ceramic mask applied to an engine operated blade having a worn tip portion.

This paste-like ceramic containing compound was used in conjunction with the weld repair of a service operated turbine blade which had a configuration similar to the blade 10 shown in FIG. 1: shaped cooling holes 26, 30 were present in the airfoil surface 12 and in the squealer pocket 22, respectively, and conventional cooling holes 28 were present in the blade tip 20. FIG. 3 shows a turbine blade 10 in cross section after engine operation. As is seen by comparing FIG. 3 with FIG. 2, the tip portion 20 of the engine operated blade has been worn down, and extends less in the outward radial direction than the tip portion 20 of the blade before engine operation, FIG. 2. The purpose of the weld repair operation was to increase the longitudinal dimension of the blade 10, by adding weld filler metal to the blade tip surface 18. Prior to welding, the coating on the blade (see, e.g., commonly assigned U.S. Pat. No. 4,585,481 to Gupta) was locally removed from the tip 20, and then the squealer pocket 22 and the shaped holes 30 within the squealer 22 were completely filled with the compound 34. The compound 34 was also applied onto the airfoil surface 12 adjacent to and even with the surface 18 of the blade tip 20. The thickness of the compound 34 on the airfoil surface 12 was in the range of about 0.050-0.200 inches, although the maximum thickness did not appear to be critical. The compound 34 was forced into the shaped holes 26, 30 and the squealer pocket 22, taking particular care to insure that the holes 26, 30 were filled, i.e., that the compound 34 was present along the length of each hole. (The length of the hole was equal to the thickness of the wall which the hole penetrated). None of the compound 34 was applied to the tip surface 18 of the blade 10, since that was the area which was to be weld repaired. In order to decrease the possibility that the compound 34 on the airfoil surface 12 would contaminate or otherwise interfere with the tip welding, the compound 34 was beveled away from the tip 18, as shown in FIG. 3.

Following a low temperature bake at about 95° C. (200° F.), to evaporate the liquid carrier from the compound, the blade was heated to about 540° C. (1,000° F.) for two hours to sinter the ceramic particles to each other, and form the mask. Temperatures as low as about 480° C. (900° F.) will likely be useful, as will temperatures above 540° C. The maximum sintering temperature for the compound will likely be dictated by the heat treatment limits of the alloy from which the blade is made. Metallographic and visual examination of the blade after sintering showed that the mask 34 completely filled the cooling holes and was structurally sound, notwithstanding the presence of some small cracks (microcracks). A deposit of weld filler metal 36 (FIG. 4) was then applied to the blade tip surface 18 using conventional TIG welding techniques.

Figure 4:
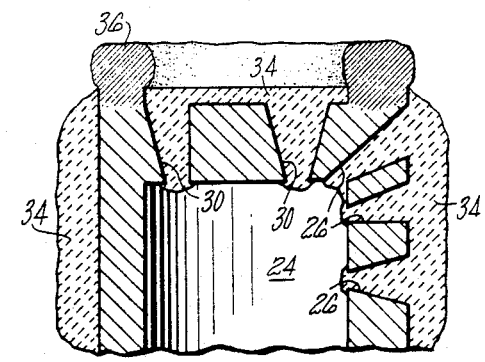
FIG. 4 is similar to FIG. 3 and shows the blade after welding.
Figure 5:
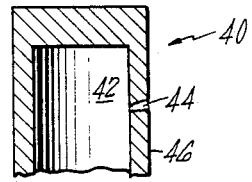
FIGS. 5-8 are simplified cross sectional views showing the weld repair of a hollow turbine vane.

After welding, inspection of the blade 10 indicated that the ceramic mask 34 on the blade surface 12 and in the cooling holes 26, 30 was still intact. More importantly, the mask 34 kept the holes 26, 30 from being filled with weld filler metal. As is seen in FIG. 4, the filler metal weld bead 36 penetrated below the original surface 18 of the blade tip 20, but was confined entirely between the mask 34 in areas that the mask 34 was present.

After welding, the blade 10 was lightly blasted with alumina abrasive media, which removed nearly all of the mask 34. Then, the blade 10 was exposed to a caustic (e.g., sodium or potassium hydroxide) autoclave cleaning process such as is described in commonly assigned U.S. Pat. No. 4,439,241 to Ault et al, which completely removed any of the remaining ceramic, and washed with a high pressure water jet to remove the caustic and any other debris still present.

The weld deposit 36 on the blade tip 20 was then machined to produce a blade having the desired length, and conventionally shaped cooling holes electrodischarge machined into the tip. (The original holes 28 had been welded shut during the repair operation.) Following all other required machining, application of the required coating on the blade surface, a post welding heat treatment, shot peening the blade root 16, and inspection, the blade was in the condition shown in FIGS. 1 and 2, and ready for service use.

EXAMPLE II

Figure 6:
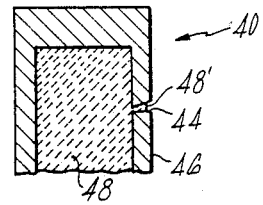
Figure 7:
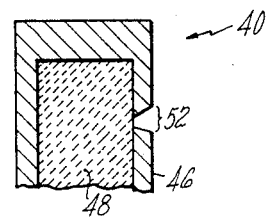
Figure 8:
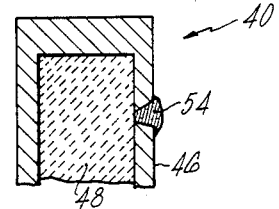

Cracks on the airfoil section of hollow vanes used in gas turbine engines are weld repaired using the techniques of this invention. The method for repairing such vanes is shown in FIGS. 5-8, where the vane 40 is shown as having an internal cavity 42 and a crack 44 which extends through the airfoil wall 46 and into the cavity 42. The first step of this method is to remove the coating (if present) on the airfoil internal and external vane surface. The coating may either be removed from the entire vane, or locally removed from areas adjacent to the crack 44. (In FIGS. 5-8, the blade 40 is shown free of a coating.) Next, a ceramic compound 48 like that in Example I is injected into the interior vane cavity 42 so as to at least fill the area adjacent to the crack 44. In some cases, it will be easiest to completely fill the cavity 42, as shown in FIG. 6. The compound 48 is baked and fired in the manner disclosed in Example I. The cracked portion 44 of the vane is then ground away using, e.g., an abrasive machining tool, (FIG. 7) so that any contamination and/or oxides present in the crack 44 are removed. This step also removes any of the compound (designated 48' in FIG. 7) which may have flowed from the cavity 42 through the crack 44. The vane 40 is ground until the crack 44 is completely removed. Whether the crack 44 has been completely removed is readily determinable by fluorescent penetrant inspection. If the crack 44 extends entirely through the airfoil wall 46 (as shown in the Figures), the grinding process is performed to expose the internal vane cavity, but so that as little of the fired ceramic mask 48 in the cavity 42 is removed. In other words, once the airfoil wall 46 is penetrated, the grinding is stopped. The ground area 52 of the vane 40 (the crack now removed) is then repaired (filled) with weld filler metal 54, which is applied by arc welding techniques such as TIG. The ceramic mask 48 in the cavity 42 acts as a backer to prevent molten filler metal from entering and solidifying in the cavity 42. If the filler metal was allowed to solidify in the vane internal cavity 42, this could complicate the insertion of an internal cavity baffle, cause structural problems, and/or disrupt air flow through the cavity during engine operation. Following the welding operation, the mask 48 is removed by caustic autoclave cleaning and high pressure water blast, as discussed in the above example. The weld bead 54 is then blended to conform with the shape of the external airfoil wall surface 46, and the vane 40 recoated, heat treated, etc., as required.

Although this invention has been shown and described with respect to a preferred embodiment thereof, it should be understood by those skilled in the art that other various changes and omissions in the form and detail thereof may be made without departing from the spirit and scope of the invention.

We claim:

1. A method for keeping a portion of a metal article substantially free from molten weld filler metal during welding, comprising the steps of applying a compound containing ceramic particles in a liquid carrier to the portion of the article to be kept free of the filler metal, and heating the article to remove the liquid carrier from the mixture and to sinter the ceramic particles to each other to form a thermally stable ceramic mask which is nonreactive with the metal article and with the molten filler metal, and readily removable from the welded article.

2. The method of claim 1, wherein the ceramic mask is electrically nonconductive.

3. A method for the arc weld repair of a hollow, air cooled metal article having a plurality of small diameter cooling holes, the method comprising the steps of filling the holes with a compound containing ceramic particles in a liquid carrier, the mixture having a paste-like consistency; heating the article to remove the liquid carrier from the compound and to sinter the ceramic particles to each other to form a thermally stable, electrically nonconductive, nonreactive ceramic mask which fills the cooling holes after sintering; welding the metal article, wherein the ceramic mask prevents molten weld metal from entering and solidifying in the holes; and removing the ceramic mask from the holes.

4. A method for arc weld repairing an air cooled, hollow turbine blade having a tip portion, a squealer pocket, and an airfoil portion, wherein the blade has a plurality of small diameter cooling holes in the tip portion, the squealer pocket, and the airfoil portion, and wherein some of the holes are shaped holes, the method comprising the steps of filling the squealer pocket and the cooling holes and coating the airfoil portion with compound containing ceramic particles in a liquid carrier, the mixture having a paste-like consistency; heating the article to remove the liquid carrier from the compound and to sinter the ceramic particles to each other to form a thermally stable, nonreactive, electrically nonconductive ceramic mask which fills the squealer and the cooling holes after sintering; arc weld repairing the tip portion of the blade by depositing a layer of filler metal on the blade tip surface, wherein the ceramic mask in the squealer pocket prevents the weld metal from solidifying in the squealer, the ceramic mask in the cooling holes prevents the weld metal from solidifying in the holes and the ceramic mask on the airfoil portion prevents the weld metal from solidifying on the airfoil; and removing the ceramic mask from the blade.

5. The method of claim 4, wherein the ceramic particles are selected from the group consisting essentially of simple and complex oxides of Group IIA, IIIA, IVA, IIIB, IVB and rare earth elements.

6. The method of claim 5, wherein the mixture of ceramic particles consists essentially of silica, zircon, and alumina, and the liquid carrier is colloidal silica.

7. A method for the arc weld repair of a defect in a metal article having an internal cavity, comprising the steps of inserting a paste-like compound containing ceramic particles in a liquid carrier in the cavity; heating the article to remove the liquid carrier from the compound and to sinter the ceramic particles to each other to form a thermally stable nonreactive ceramic mask in the internal cavity; machining away the defect without removing a substantial amount of the mask; weld repairing the defect; and removing the ceramic mask.

8. A mixture sinterable to form a mask used during the weld repair of a metal article, consisting essentially of a mixture of silica, zircon, and alumina fiber, and an amount of colloidal silica to form a paste-like consistency.

9. The mixture of claim 8, containing about 10–50% zircon, 1–20 percent alumina, balance silica.

* * * * *